United States Patent [19]
Furuoya

[11] Patent Number: 5,805,294
[45] Date of Patent: Sep. 8, 1998

[54] DOCUMENT SIZE DETECTION BY A PRESCAN HAVING AN ACCELERATION REGION

[75] Inventor: Sadao Furuoya, Ebina, Japan

[73] Assignee: Fuji Xerox, Co., Ltd., Tokyo, Japan

[21] Appl. No.: 699,247

[22] Filed: Aug. 19, 1996

[30] Foreign Application Priority Data

Aug. 21, 1995 [JP] Japan ..................................... 7-212128

[51] Int. Cl.⁶ .................................................. G03G 15/00
[52] U.S. Cl. ........................... 358/296; 358/504; 399/370
[58] Field of Search .................................. 358/504, 444, 358/296, 370, 389; 347/110, 262, 264, 139, 235, 248; 399/370, 389

[56] References Cited

U.S. PATENT DOCUMENTS

| | | | |
|---|---|---|---|
| 4,963,934 | 10/1990 | Nezu ........................................ | 355/235 |
| 5,198,853 | 3/1993 | Ichihara et al. .......................... | 355/244 |
| 5,444,555 | 8/1995 | Ono ......................................... | 358/494 |
| 5,477,341 | 12/1995 | Obata ...................................... | 358/448 |
| 5,481,365 | 1/1996 | Arimoto ................................... | 358/296 |

FOREIGN PATENT DOCUMENTS

3-121472  5/1991  Japan .

*Primary Examiner*—Robert Nappi
*Assistant Examiner*—Gregory J. Toatley, Jr.
*Attorney, Agent, or Firm*—Oliff & Berridge PLC

[57] ABSTRACT

An image reading unit has a line sensor for reading a document and producing image data. A line counter counts the number of lines that are scanned during a period from a start of reading by the image reading unit until a time point when an edge of the document is read. A ROM stores, in advance, a corresponding relationship between error accumulation values and the numbers of lines. A control section reads out, from the ROM, an error accumulation value corresponding to the number of lines counted by the line counter, and determines the position of the edge of the document in the auxiliary scanning direction by subtracting the readout error accumulation value from a product of the counted number of lines and the auxiliary scanning pitch, thereby detecting a document length in the auxiliary scanning direction.

15 Claims, 7 Drawing Sheets

| COUNT OF LINE COUNTER | ERROR ACCUMULATION VALUE (mm) |
|---|---|
| 0 < COUNT ≤ 3 | 0 |
| 3 < COUNT ≤ 8 | 1 |
| 8 < COUNT ≤ 15 | 2 |
| 15 < COUNT ≤ 22 | 3 |
| 22 < COUNT ≤ 30 | 4 |
| 30 < COUNT ≤ 39 | 5 |
| 39 < COUNT ≤ 51 | 6 |
| 51 < COUNT ≤ 70 | 7 |
| 70 < COUNT | 8.22 |

DOCUMENT SIZE DETECTION BY A PRESCAN HAVING AN ACCELERATION REGION

BACKGROUND OF THE INVENTION

1. Field of the Invention

The present invention relates to a document size detecting apparatus and method suitable for use in, for instance, a digital copying machine which reads an original document and performs image formation based on resulting image data.

2. Description of the Relates Art

Conventionally, in a digital copying machine, an original document is read by a line sensor (i.e., one-dimensional sensor) which is moved relatively to the document in the auxiliary scanning direction, that is perpendicular to the main scanning direction, and image formation is performed based on resulting image data. In the case of a size enlargement mode, the amount of image data is increased by performing interpolation in the main scanning direction and reducing the auxiliary scanning speed. In the case of a size reduction mode, the amount of image data is decreased by thinning it in the main scanning direction and increasing the auxiliary scanning speed.

In the copying machine, it is necessary to select a copying sheet of a proper size in accordance with such copying conditions as the document size and the magnification. To this end, a scan for detecting the document size etc. (hereinafter referred to as a prescan) is performed before a scan for producing image data to be used for image formation (hereinafter referred to as a main scan or an image formation scan). In the prescan, the size of a document is determined by detecting positions of the edges of the document based on, for instance, a difference in density or color between the document and the document holder of the machine.

In general, the prescan is performed at a speed slower than (or approximately equal to) the scanning speed for the minimum copying magnification, to secure sufficient detection accuracy. That is, the line interval in the auxiliary scanning direction (i.e., auxiliary scanning pitch), which is indicated by image data, is kept constant by eliminating a variation in scanning speed.

In recent years, there is a requirement that the time taken for an overall copying operation be shortened. One solution would be to shorten the prescan time by performing a prescan at high speed.

To perform a prescan at high speed, it is necessary to move the line sensor relatively to a document at a high and constant speed. In a configuration in which the line sensor is moved while a document is fixed, there are needed an acceleration region to start the movement of the line sensor and accelerate it to the intended high and constant speed and a deceleration region to decelerate and stop the moving line sensor, in addition to an image reading region where the line sensor reads a document at the constant speed. This results in an increase in the size of the image reading unit.

If no acceleration region is provided and the size of the image reading unit is not changed, the line sensor should read a document in an accelerated state even in the image reading region. Therefore, the auxiliary scanning pitch varies, so that the document size is not detected correctly.

Those problems also exist in a configuration in which a document is moved while the line sensor is fixed, because the document needs to be moved at a high and constant speed.

SUMMARY OF THE INVENTION

An object of the present invention is to provide a document size detecting apparatus and method which can detect the size of an original document with correct detection of the positions of the edges of the document and without a large change in the size of the image reading unit.

According to the invention, there is provided a document size detecting apparatus comprising:

reading means for reading a document and producing corresponding image data;

first counting means for counting the number of lines that are scanned during a period from a start of reading by the reading means until a time point when an edge of the document is read;

storing means for storing, in advance, a corresponding relationship between values and the numbers of lines;

readout means for reading out, from the storing means, a value corresponding to the number of lines counted by the first counting means; and determining means for determining a position of the edge of the document in the auxiliary scanning direction based on the readout value, and thereby detecting a length of the document in the auxiliary scanning direction.

Further, there is provided a document size detecting method using reading means for reading a document and producing corresponding image data, comprising the steps of:

storing, in advance, a corresponding relationship between values and the numbers of lines in storing means;

counting the number of lines that are scanned during a period from a start of reading by the reading means until a time point when an edge of the document is read;

reading out, from the storing means, a value corresponding to the counted number of lines; and determining a position of the edge of the document in the auxiliary scanning direction based on the readout value, and thereby detecting a length of the document in the auxiliary scanning direction.

DESCRIPTION OF THE PREFERRED EMBODIMENTS

A preferred embodiment of the present invention will be described with reference to the accompanying drawings.

Figure 1:
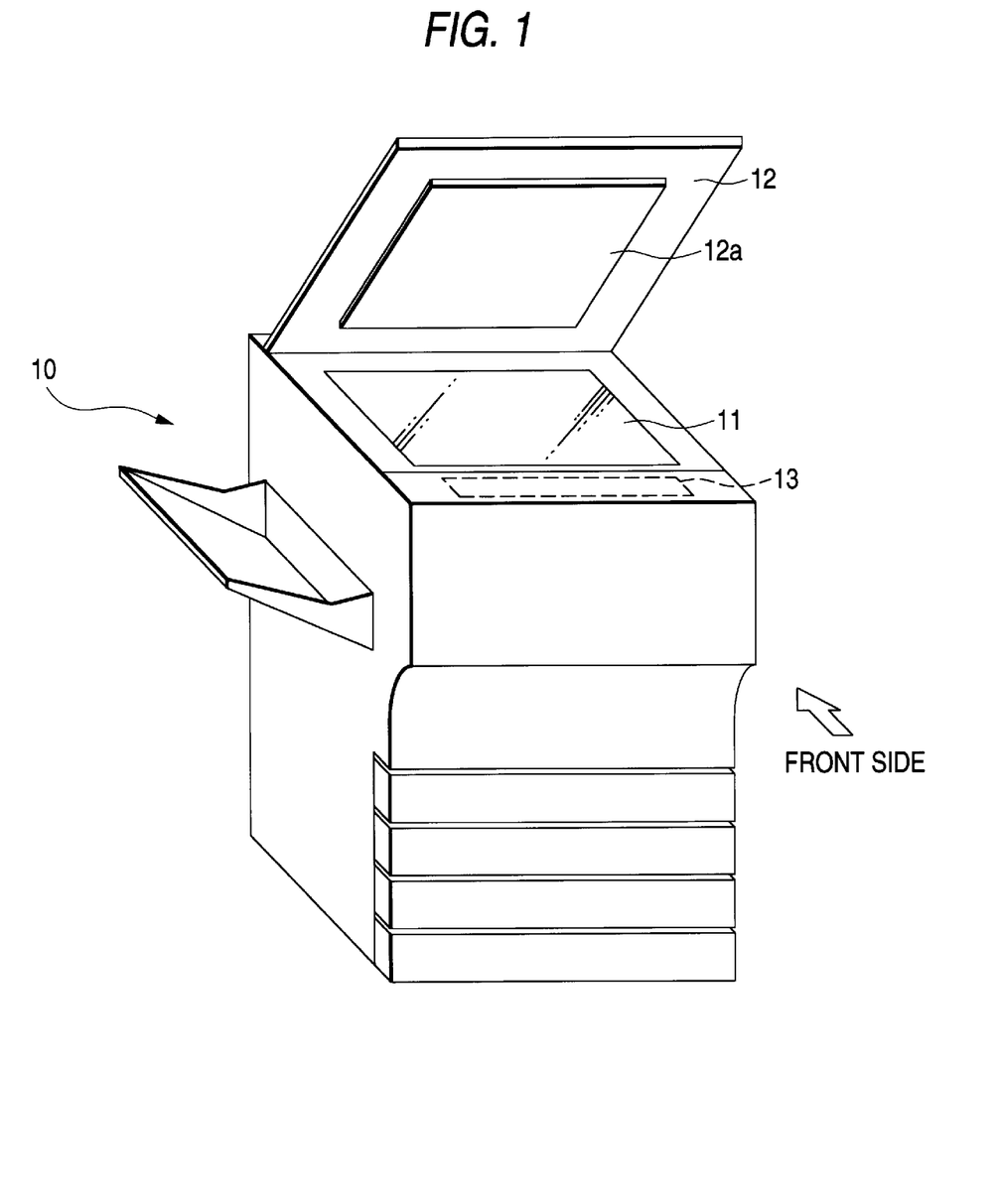
FIG. 1 is a perspective view showing an appearance of a copying machine incorporating a document size detecting apparatus according to an embodiment of the present invention.

FIG. 1 is a perspective view showing an appearance of a copying machine 10 incorporating a document size detecting apparatus according to this embodiment. As shown, the copying machine 10 includes a rectangular copying glass plate 11 on which an original document is to be placed, a document cover 12 which is opposed to a document to make it flat while it is read, and an operation panel 13 which allows various settings to be entered.

Figure 2:
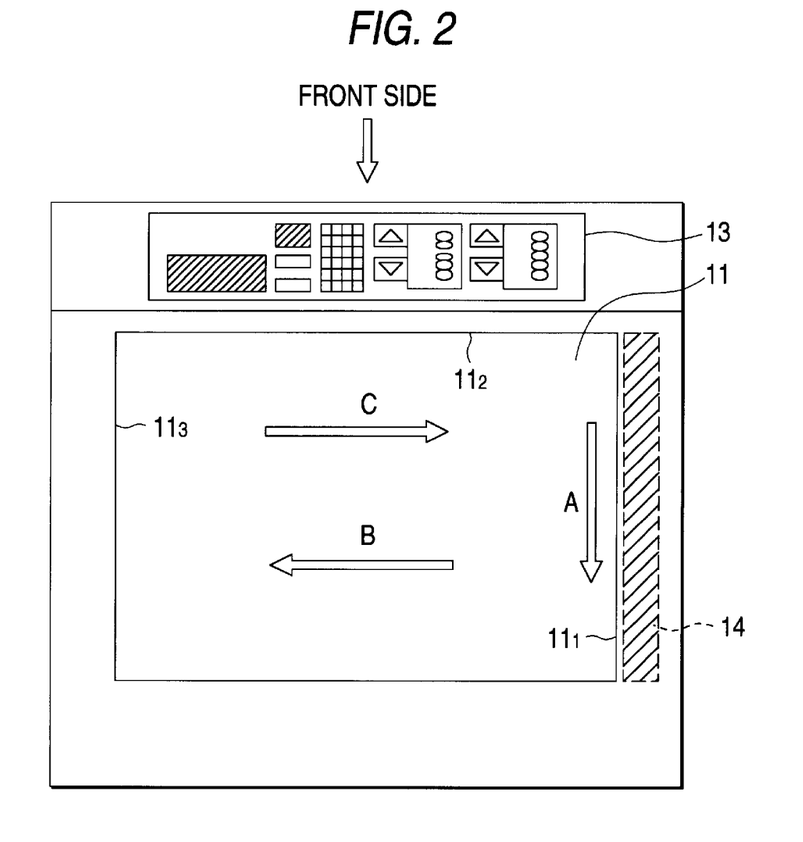
FIG. 2 is a plan view of a copying glass plate and an operation panel in a state that a document cover is opened.

FIG. 2 is a plan view of the copying glass plate 11 and the operation panel 13 in a state that the document cover 12 is opened. In FIG. 2, reference numeral 14 denotes an initial position (home position) of a line sensor in an image reading unit. Numerals $11_1$ and $11_2$ denote vertical and horizontal sides of the copying glass plate 11 which correspond to original document abutment positions (hereinafter referred to as registration positions). Numeral $11_3$ denotes a vertical side of the copying glass plate 11 which is opposed to the side $11_1$. The vertical side $11_3$ corresponds to a read end position. Arrow A indicates the main scanning direction of the line sensor, arrows B and C indicate the auxiliary scanning directions. Therefore, in this embodiment, the effective image reading region ranges from the registration position $11_1$ to the read end position $11_3$.

In the embodiment, the image reading unit performs a prescan to detect the document size etc. before main scans for producing image data to be used for image formation. In the prescan, items other than the document size such as the density and the kind of document (a photograph, a text, etc.) are detected when a forward scan in direction B. The document size is detected in a backward scan in direction C. The prescan speed is set at 6 times the main scanning speed (100% magnification copying).

The resolution of the image reading unit is set at 400 dots per inch in the main scanning direction and 400 lines per inch in the auxiliary scan direction in the case of 100% magnification copying. Therefore, the main scanning pitch indicative of a pixel interval in the main scanning direction is 0.0635 mm, and the auxiliary scanning pitch indicative of a line interval in the auxiliary scanning direction has the same value.

Figure 4:
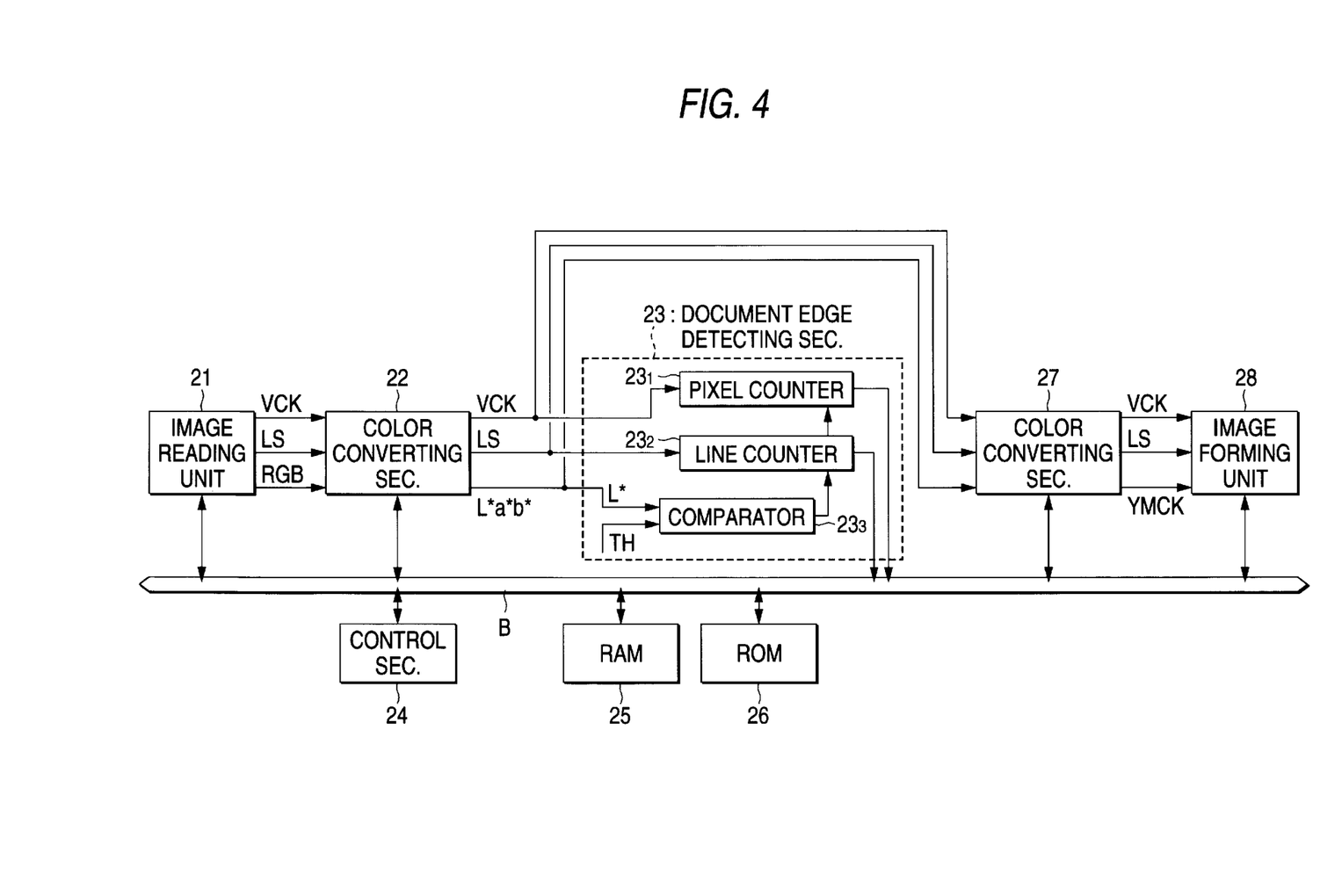
FIG. 4 is a block diagram showing an electrical configuration of the document size detecting apparatus of the embodiment.

FIG. 4 is a block diagram showing an electrical configuration of the embodiment. In FIG. 4, an image reading unit 21 reads an original document by the above-mentioned line sensor and produces image data. More specifically, in connection with the main scanning, the image reading unit 21 outputs image data for each pixel in synchronism with a video clock signal VCK. This operation is performed for each line in synchronism with a line sync signal LS. The image reading unit 21 outputs image data for each of three colors R, G and B.

A color converting section 22 converts the image data of R, G and B into image data of L*, a* and b*.

A document edge detecting section 23 is made up of a pixel counter $23_1$, a line counter $23_2$, and a comparator $23_3$. The pixel counter $23_1$ counts the number of pixels in the main scanning direction by counting video clocks VCK. The count of the pixel counter $23_1$ is reset by the line sync signal LS (not shown in FIG. 4).

The line counter $23_2$ counts the number of lines in the auxiliary scanning direction by counting line sync signals LS. The count of the line counter $23_2$ is reset (not shown) every time one page of a document is read. The line counter $23_2$ is permitted to count the number of lines only when the line sensor scans the effective image reading region.

The comparator $23_3$ compares data L* indicative of lightness of image data with data TH. At a time point when the data L* comes coincident with or in disagreement with the data TH, the comparator $23_3$ supplies a signal to that effect to the pixel counter $23_1$ and the line counter $23_2$. Upon receipt of that signal, the pixel counter $23_1$ and the line counter $23_2$ output count values at that time point.

The back side 12a of the document cover 12 is black or has a mirror surface. Therefore, when a portion outside a document is read, black image data is produced. The threshold value TH is so set as to represent such black data. Therefore, the time point when the comparator $23_3$ judges that the data L* comes equal to the data TH means a time point when the received image data turns from data obtained from a document region to data obtained from a region outside the document region. The time point when the data L* comes unequal to the data TH means a time point when the image data turns from data obtained from a region outside a document region to data obtained from the document region. That is, either time point corresponds to a boundary between a document region and the other regions.

Therefore, a count that is output from the pixel counter $23_1$ indicates the position of an edge of a document in the main scanning direction in the form of the number of pixels of the line sensor as counted from the registration position $11_2$. In the case of a prescan in direction C (auxiliary scanning), a count that is output from the line counter $23_2$ indicates the number of lines that have been scanned while the line sensor moves from the read end position $11_3$ to the position of an edge of the document.

A control section 24 controls the respective sections through a bus B. A RAM 25 temporarily stores the count values of the pixel counter $23_1$ and the line counter $23_2$, and other data. A ROM 26 stores a table (described later).

A color converting section 27 receives the image data of L*, a* and b* from the color converting section 22, and converts those image data into image data indicative of densities (toner amounts) of the primary colors Y (yellow), M (magenta), C (cyan), and K (black). Controlled by the control section 24, an image forming unit 28 selects proper copy sheets in accordance with the determined document size, and forms an image with toner amounts that are indicated by the image data of Y, M, C and K produced by the color converting section 27.

The contents of a table to be stored into the ROM 26 will be described below.

Figure 3:
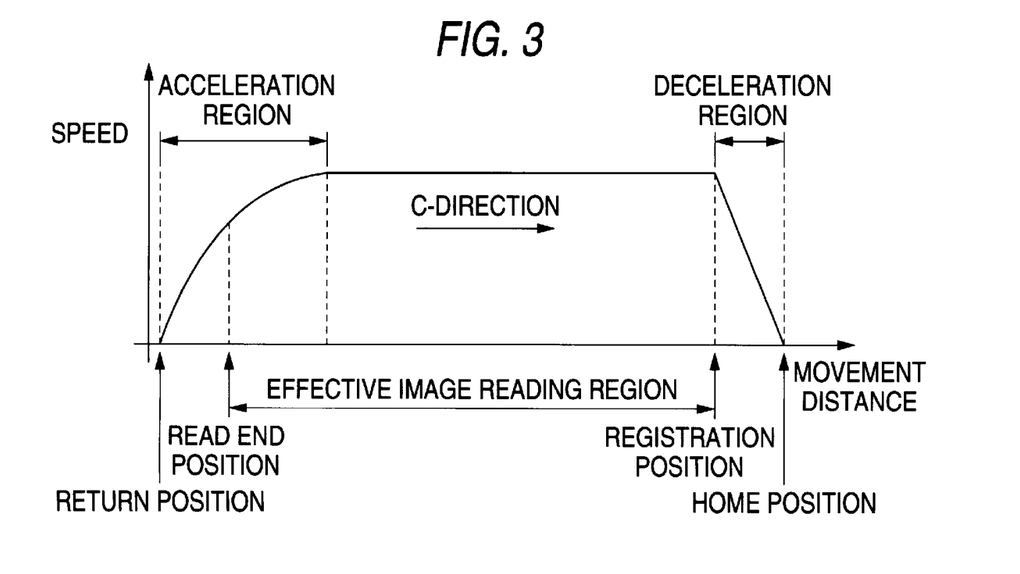
FIG. 3 is a graph showing a speed variation characteristic of a line sensor.

As described above, in a prescan in direction C, the line sensor moves 6 times faster than in a main scan (image formation scan). Therefore, as shown in FIG. 3, the acceleration region that is necessary for the line sensor to reach a high movement speed extends from the return position past the read end position $11_3$ to cover part of the effective image reading region. Therefore, in the initial portion of a prescan in direction C, the line sensor is subjected to acceleration rather than performs constant-speed movement.

Therefore, according to the conventional scheme in which with the assumption that the line sensor makes constant-speed movement in the effective image reading region, the product of the number of lines scanned between the read end position $11_3$ and the document edge position and the distance (auxiliary scanning pitch) the line sensor normally moves in the auxiliary scanning direction during one cycle of the line sync signal LS is employed as a distance from the read end position $11_3$ to the document edge position, the accumulation value of errors in the acceleration region added to the thus-obtained distance increases as the position goes away from the read end position $11_3$.

To avoid this problem, in this embodiment, an accumulated error corresponding to the number of lines indicated by the count of the line counter $23_2$ is subtracted from the product of the above number of lines and the auxiliary scanning pitch, to obtain a true distance. The ROM 26 stores a table correlating the numbers of lines with accumulated error values.

Figure 5:
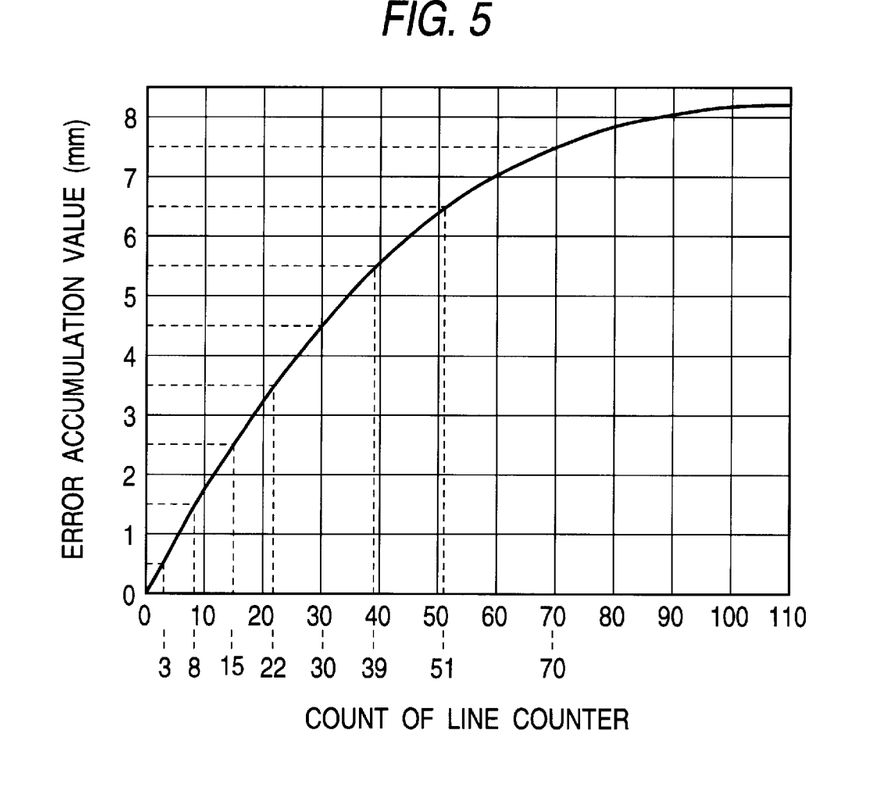
FIG. 5 is a graph showing a characteristic as a basis of a correction table according to the embodiment.

FIG. 5 shows an example of such a corresponding relationship to be stored in the table. As described above, as the position goes away from the read end position $11_3$, errors in the acceleration region are more accumulated. Accordingly, in FIG. 5, the error accumulation value increases with the increase of the number of lines indicated by the count value of the line counter $23_2$. However, after counting of a certain number of lines, the line sensor comes to make constant-speed movement in the auxiliary scanning direction; since errors are no longer accumulated, and the error accumulation value is saturated.

In other words, in the region where the line sensor is accelerated and hence the auxiliary scanning pitch is not constant, the error accumulation value increases as the number of lines increases and the auxiliary scanning pitch becomes longer. On the other hand, in the range where the line sensor moves at a constant speed and the auxiliary scanning pitch is constant, the error accumulation value is constant, i.e., saturated. The corresponding relationship between the number of lines and the error accumulation value is determined based on a speed variation characteristic experimentally obtained in advance (see FIG. 3)

In forming a table, error accumulation values may be stored for respective count value as in the case of FIG. 5. However, it suffices that the document size be determined with accuracy on the order of mm.

Figure 6:
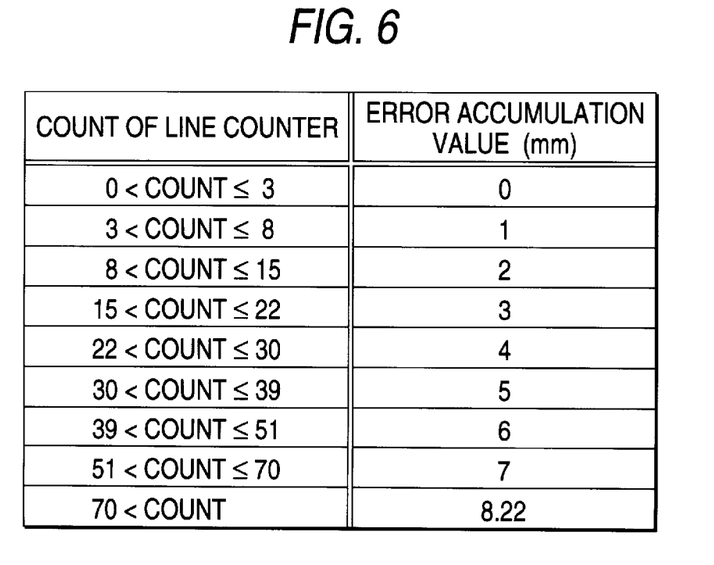
FIG. 6 shows the contents of the correction table according to the embodiment.

In view of the above, in this embodiment, as shown in FIG. 6, count values of lines are divided into nine ranges so that each range corresponds to an integer obtained by rounding off the fractions. When a count value representative of the number of lines is detected, an error accumulation value corresponding to the detected count value is uniquely output.

The operation of the document size detecting apparatus thus constructed will be described below. An original document is placed on the copying glass plate 11 shown in FIG. 1, and an instruction to start a copying operation is entered through the operation panel 13. In response, the control section 24 shown in FIG. 4 controls the image reading unit 21 to make it perform a prescan.

The image reading unit 21 moves the line sensor in direction B from the initial position to the return position (see FIG. 2), to effect a forward scan. Items other than the document size are detected by using data that is output during the forward scan and other data. However, since this operation is not directly related to the invention, it will not be described any further.

After the forward scan, the image reading unit 21 moves the line sensor in direction C from the return position (backward scan), to detect the document size. Image data of R, G and B produced during the backward scan are converted by the color converting section 22 into image data of $L^*$, $a^*$ and $b^*$. Of the image data of $L^*$, $a^*$ and $b^*$, the data $L^*$ is compared by the comparator $23_3$ with the black data that represents the lightness of the back side $12a$ of the document cover 12. Further, video clocks VCK are counted by the pixel counter $23_1$, and line sync signals LS are counted by the line counter $23_2$. If the comparator $23_3$ judges, based on the comparison, that the data $L^*$ indicates a boundary between the document region and the other regions, it causes the pixel counter $23_1$ and the line counter $23_2$ output their count values at that time point. The control section 24 has the count values stored into the RAM 25 at every output of count values.

After the prescan is completed, the control section 24 effects a document size detecting process described below. For convenience of description, the document size detecting process will be described separately for the auxiliary scanning direction and the main scanning direction.

Figure 8:
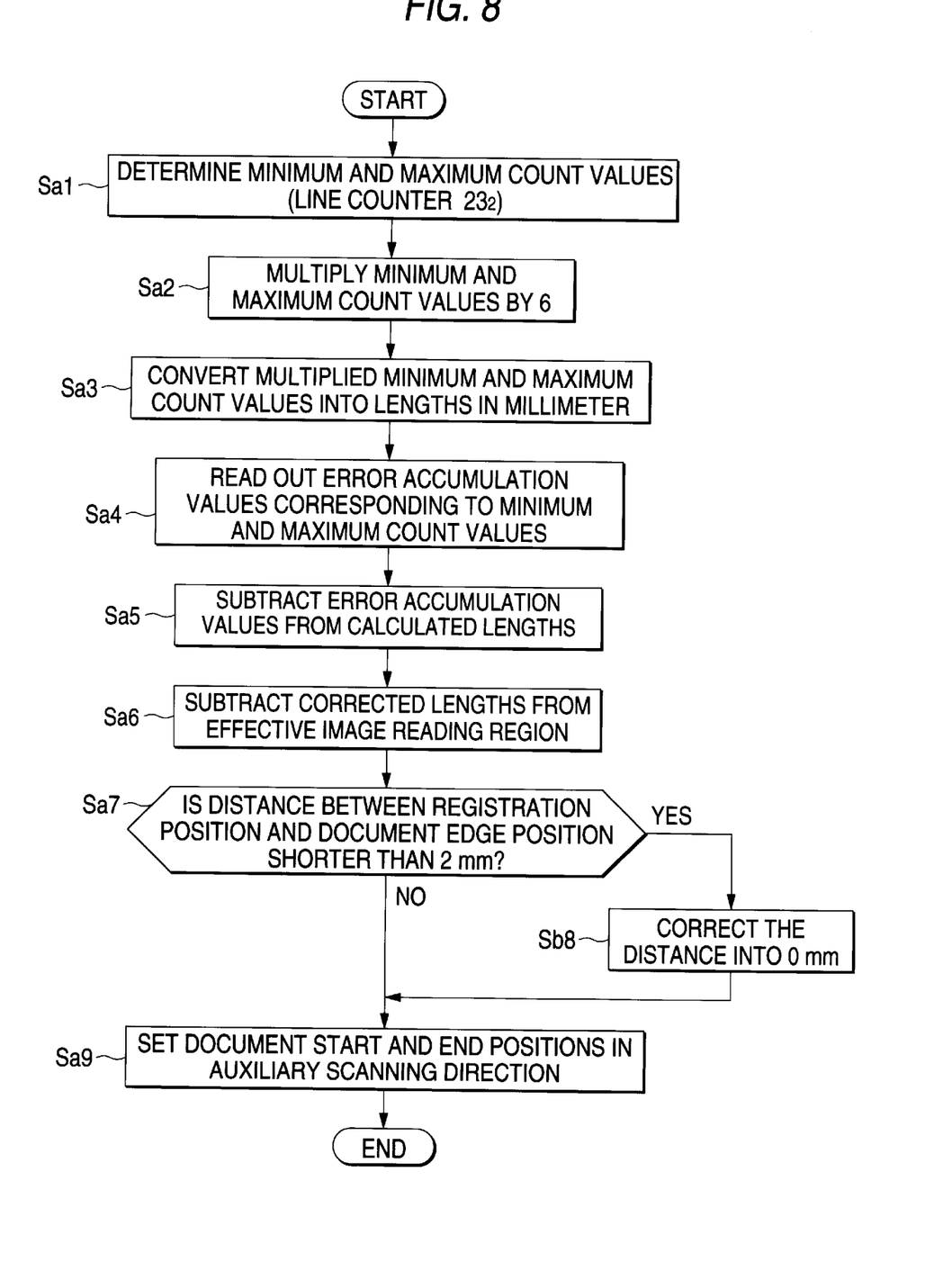
FIG. 8 is a flowchart showing a document size detecting process in the auxiliary scanning direction.

First, the document size detecting process in the auxiliary scanning direction will be described, which is shown in a flowchart of FIG. 8. First, in step Sa1, the control section 24 (see FIG. 4) detects the maximum and minimum values of the count values that were output from the line counter $23_2$ and stored in the RAM 25.

Figure 7:
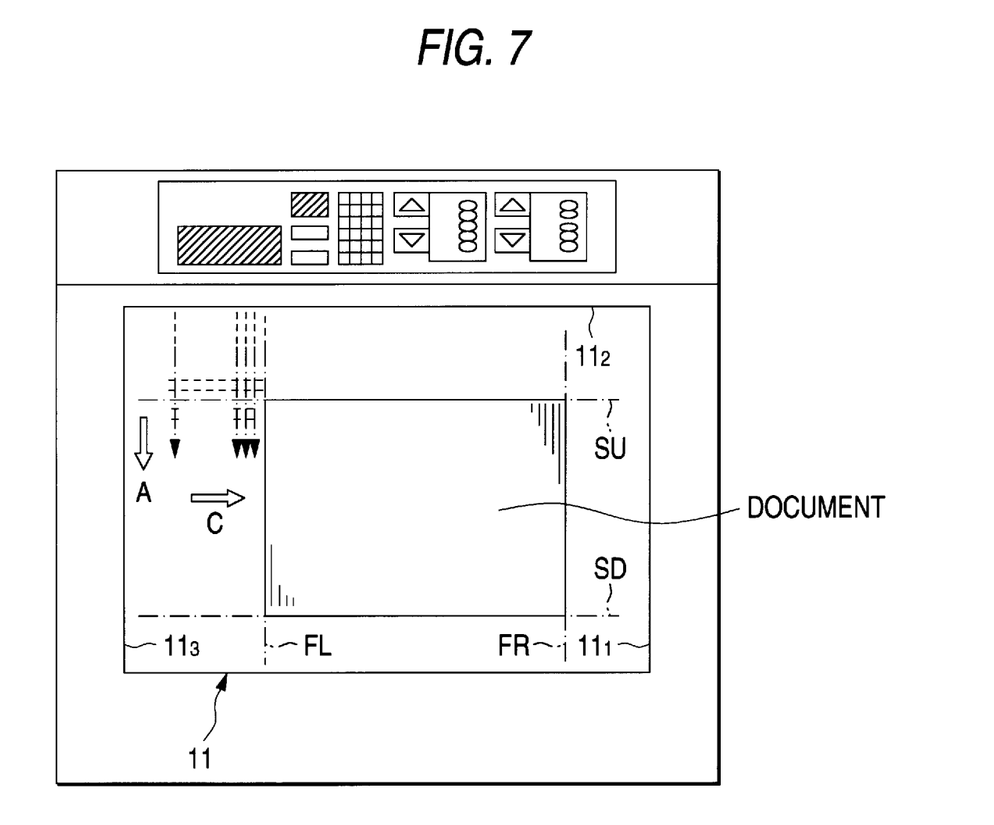
FIG. 7 is a plan view of the copying glass plate and the operation panel illustrating the operation of the document size detecting apparatus according to the embodiment.

It is assumed that an original document is placed on the copying glass plate 11 as shown in FIG. 7. A document is scanned in the auxiliary scanning direction as shown in FIG. 7. Therefore, in a prescan in direction C, the minimum count value is output from the line counter $23_2$ when the line sensor reaches a boundary line FL corresponding to the edge of the document which is parallel with the side of the copying glass plate 11 at the read end position $11_3$ and closest to that side. On the other hand, the maximum count value is output from the line counter $23_2$ when the line sensor reaches a boundary line FR corresponding to the edge of the document which is parallel with the side of the copying glass plate 11 at the read end position $11_3$ and farthest from that side.

In a prescan in direction C, the count value that is output from the line counter $23_2$ indicates the number of lines of auxiliary scanning that is performed while the line sensor moves from the read end position $11_3$ to an edge of the document. The prescan is performed six times faster than the auxiliary scanning of 100% magnification copying. Therefore, in step Sa2, the control section 24 multiplies the minimum count value and the maximum count value as output from the line counter $23_2$ by 6 to convert those values to count values of the auxiliary scanning of 100% magnification copying. Then, in step Sa3, the control section 24 converts the resulting count values into lengths in millimeters, to thereby obtain distances from the read end position $11_3$ to the boundary lines FL and FR. For example, when the count value output from the line counter $23_2$ is 50, it is converted in the following manner:

$$50 \times 6 \times 0.0635 = 19.05 \text{ mm} \tag{1}$$

In Equation (1), 0.0635 is the auxiliary scanning pitch in millimeter in 100% magnification copying.

In consideration of the fact that the error accumulation values stored in the ROM 26 have no fractions, the fractions of the value obtained by the above conversion is also rounded off. Thus, 19.05 mm in Equation (1) is rounded to 19 mm.

If the line sensor moved at a constant speed, the converted value obtained in step Sa3 would directly indicate a distance from the read end position $11_3$ to the boundary line FL or FR. However, in the embodiment in which the line sensor is accelerated in a region around the read end position $11_3$, the converted value includes an error accumulation value and does not represent the actual distance correctly. Further correction should be made in this respect.

To this end, in step Sa4, the control section 24 reads error accumulation values corresponding to the minimum value and maximum count values from the table stored in the ROM 26. For example, if the count value of the line counter $23_2$ is 50, "6 mm" is read out as an error accumulation value.

In step Sa5, the control section 24 subtracts the accumulated error values from the converted values of the maximum and minimum count values, to thereby obtain true distances from the read end position $11_3$ to the boundary lines FL and FR. For example, if the count value of the line counter $23_2$ is 50, the corresponding error accumulation value 6 mm is subtracted from 19 mm as calculated according to the Equation (1), to obtain 13 mm as a true distance from the read end position $11_3$ to a position where the count value is 50.

Thus, the distances from the read end position $11_3$ to the boundary lines FL and FR have been obtained. Meanwhile, the document size is detected through a prescan in direction C, which is opposite to direction B. In reading a document by main scans (image formation scans), it is convenient to use the distance as measured from the registration position $11_1$ rather than from the read end position $11_3$.

For this reason, in step Sa6, the control section 24 obtains the distances from the registration position $11_1$ to the boundary lines FL and FR by subtracting the distances from the read end position $11_3$ to the boundary lines FL and FR from the length of the effective image reading region.

Next, in step Sa7, the control section 24 judges whether the distance from the registration position $11_1$ to the boundary line FR is shorter than 2 mm. If it is judged shorter than 2 mm, the control section 24 judges that the document abuts the registration position $11_1$ in step Sa8, and discards the distance obtained in step Sa6 and sets it at 0 mm, which means that the registration position $11_1$ coincides with the boundary line FR.

In step Sa9, the control section 24 sets the boundary lines FR and FL as the document start position and the document end position, respectively, in connection with the auxiliary scanning direction.

Figure 9:
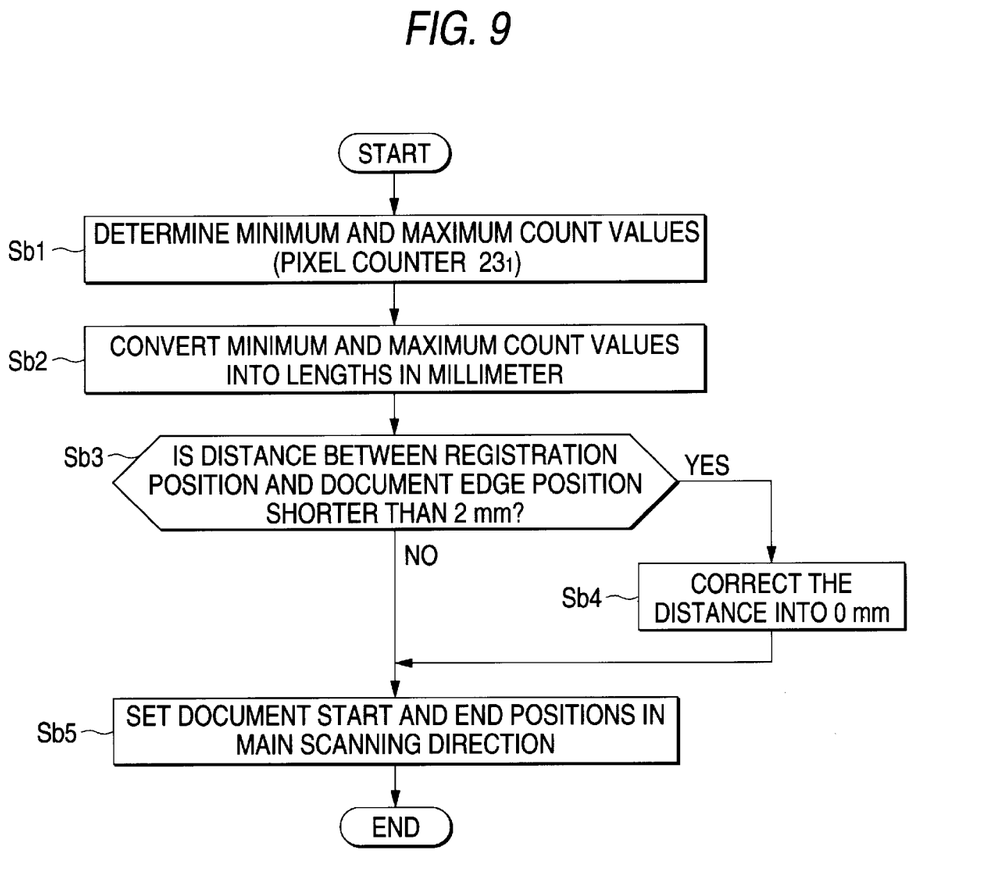
FIG. 9 is a flowchart showing a document size detecting process in the main scanning direction.

Next, a document size detecting process in the main scanning direction will be described with reference to a flowchart of FIG. 9. In step Sb1, the control section 24 obtains the minimum and maximum values of the count values that were output from the pixel counter $23_1$ and stored in the RAM 25.

It is assumed that a document is put on the copying glass plate 11 as shown in FIG. 7. Since the document is scanned in the main scanning direction as shown in FIG. 7 and the count of the pixel counter $23_1$ is reset by the line sync signal LS, the pixel counter $23_1$ produces a count value two times when one line is scanned. The minimum value of the count values indicates the position, in terms of the number of pixels of the line sensor as counted from the registration position $11_2$ in direction A, of a portion of a boundary line SU corresponding to the edge of the document which is parallel with the side of the copying glass plate 11 at the registration position $11_2$ and closest to that side. The maximum value of the count values indicates the position, in terms of the number of pixels of the line sensor as counted from the registration position $11_2$ in direction A, of a portion of a boundary line SD corresponding to the edge of the document which is parallel with the side of the copying glass plate 11 at the registration position $11_2$ and closest to that side.

Then, in step Sb2, the control section 24 converts the minimum and maximum count values of the pixel counter $23_1$ into lengths in millimeter. For example, if the count value of the pixel counter $23_1$ is 50, it is converted in the following manner:

$$50 \times 0.0635 = 3.175 \text{ mm} \quad (2)$$

In Equation (2), 0.0635 is the main scanning pitch in millimeter.

In consideration of the fact that the fractions of the converted value are rounded off in the document size detecting process in the auxiliary scanning direction, the fractions of the converted value are also rounded off in the document size detecting process in the main scanning direction. Accordingly, the converted value calculated according to the equation (2) is rounded of into 3 mm.

In the document size detecting process in the main scanning direction, unlike the case of the auxiliary scanning direction, there is no need of considering whether the scanning is made at a constant speed. Therefore, the converted values themselves obtained in step Sb2 indicate the distances the distance from the registration position $11_2$ to the boundary line SU and the distance from the registration position $11_2$ to the boundary line SD in the main scanning direction.

In step Sb3, the control section 24 judges whether the distance from the registration position $11_2$ to the boundary line SU is shorter than 2 mm. If it is judged shorter than 2 mm, the control section 24 judges that the document abuts the registration position $11_2$ in step Sb4, and discards the distance obtained in step Sb2 and sets it at 0 mm.

In step Sb5, the control section 24 sets the boundary lines SU and SD as the document start position and the document end position in the main scanning direction.

In this way, the document start positions and the document end positions are set in the main and auxiliary scanning directions (steps Sa9 and Sb5). Then, the control section 24 calculates the lengths of the document in the main and auxiliary scanning directions, judges the size of the document based on the calculated lengths, and transfers a result of the judgement to the image forming unit 28. The image forming unit 28 selects copy sheets suitable for image formation based on the document size, the copy magnification, and other factors.

Thereafter, the control section 24 controls the image reading unit 21 so that it performs a main scan (image formation scan) at the set copy magnification, and also controls the image forming unit 28 so that it forms an image based on image data of Y, M, C and K that are produced by the main scan.

As described above, according to this embodiment, even where the line sensor does not move at a constant speed in the effective image reading region in a prescan, the position and the size of an original document can be detected based on image data produced in the prescan. Therefore, there is no need of providing an approach region where the line sensor is accelerated to a high and constant speed. This allows size reduction of the apparatus. Further, since the line sensor is still moved at high speed for the document size detection, the copying time does not increase.

The embodiment can exactly detect the position and the region of an original document placed on the copying glass plate 11 in addition to its size. The thus-detected position and region of the document may be used in an image reading operation in a main scan (image formation scan).

In the above embodiment, the table of the ROM 26 stores error accumulated values corresponding to count values of the line counter $23_2$. The control section 24 corrects the distance to a boundary line which is indicated by a certain count value by using a corresponding error accumulation value, to obtain a correct distance to the boundary line (i.e., the position of an edge of the document in the auxiliary scanning direction). Thus, the document length in the auxiliary scanning direction is obtained. That is, in the embodiment, once a count value is output from the line counter $23_2$, the position of an edge of the document in the auxiliary scanning direction is calculated uniquely. The embodiment may be modified such that a unique corresponding relationship between count values of the line counter $23_2$ and document edge positions in the auxiliary scanning direction is stored in the form of a table, and a document edge position in the auxiliary scanning direction is directly obtained from a count value by referring to the table.

As described above, the invention provides the following advantages.

Even if the auxiliary scanning pitch is not constant, the distances from the read end position to document edges in the auxiliary scanning direction can be determined correctly, to allow detection of a document length in the auxiliary scanning direction. Therefore, it is not necessary to increase the apparatus size in connection with the properties required for the document reading.

Where correction values are stored for respective ranges of count values of the line counter, the memory capacity necessary for storing the correction values can be reduced.

Since the document size can be detected upon determination of document lengths in both main and auxiliary scanning directions, it becomes possible to select copy sheets having a proper size.

What is claimed is:

1. A document size detecting apparatus, comprising:

reading means for reading a document and producing corresponding image data;

first counting means for counting a number of lines that are scanned during a period from a start of reading by the reading means until a time point when an edge of the document is read;

storing means for storing, in advance, a corresponding relationship between a plurality of values and the number of lines;

readout means for reading out, from the storing means, a selected value corresponding to the number of lines counted by the first counting means; and determining means for determining a position of the edge of the document in the auxiliary scanning direction based on the selected value, and thereby detecting a length of the document in the auxiliary scanning direction.

2. The document size detecting apparatus according to claim 1, wherein the values stored in the storing means are correction values, and wherein the determining means determines the position of the edge of the document by correcting a distance that is calculated from the counted number of lines by using the selected correction value.

3. The document size detecting apparatus according to claim 2, wherein the storing means stores the correction values for respective divisional ranges of a total range of the numbers of lines, and wherein the readout means reads out the selected correction value corresponding to a divisional range to which the counted number of lines belongs.

4. The document size detecting apparatus according to claim 2, wherein a pitch of auxiliary scanning of the reading means increases and reaches a constant pitch as the auxiliary scanning proceeds, and wherein the correction values stored in the storing means increase with increase of the auxiliary scanning pitch and have a constant value in a range where the auxiliary scanning pitch has the constant pitch.

5. The document size detecting apparatus according to claim 4, wherein the determining means corrects a distance that is a product of the counted number of lines and the constant auxiliary scanning pitch by subtracting the readout correction value from the distance.

6. The document size detecting apparatus according to claim 1, further comprising second counting means for counting the number of pixels that are scanned in a main scanning direction during a period from a start of reading by the reading means in the main scanning direction until a time point when an edge of the document is read, wherein the determining means determines a position of the edge of the document in the main scanning direction by calculating a product of the counted number of pixels and a main scanning pitch of the reading means, and thereby detecting a width of the document in the main scanning direction.

7. The document size detecting apparatus according to claim 6, wherein the reading means again reads the document over a range defined by the determined positions of both edges of the document in each of the main and auxiliary directions, and produces corresponding image data.

8. The document size detecting apparatus according to claim 7, wherein an auxiliary scanning pitch of the reading means in a scan for producing the image data is shorter than the auxiliary scanning pitch in a prescan for detecting a document size.

9. A document size detecting method using reading means for reading a document and producing corresponding image data, comprising the steps of:

storing, in advance, a corresponding relationship between a plurality of values and a number of lines in storing means;

counting the number of lines that are scanned during a period from a start of reading by the reading means until a time point when an edge of the document is read;

reading out, from the storing means, a selected value corresponding to the counted number of lines; and determining a position of the edge of the document in the auxiliary scanning direction based on the readout selected value, and thereby detecting a length of the document in the auxiliary scanning direction.

10. The document size detecting method according to claim 9, wherein the values stored in the storing means are correction values, and wherein the determining step determines the position of the edge of the document by correcting a distance that is calculated from the counted number of lines by using the selected correction value.

11. The document size detecting method according to claim 10, wherein the storing step stores the correction values for respective divisional ranges of a total range of the numbers of lines, and wherein the read step reading out the selected correction value corresponding to a divisional range to which the counted number of lines belongs.

12. The document size detecting method according to claim 10, wherein a pitch of auxiliary scanning of the reading means increases and reaches a constant pitch as the auxiliary scanning proceeds, and wherein the correction values stored in the storing means increase with increase of the auxiliary scanning pitch and have a constant value in a range where the auxiliary scanning pitch has the constant pitch.

13. The document size detecting method according to claim 12, wherein the determining means corrects a distance that is a product of the counted number of lines and the constant auxiliary scanning pitch by subtracting the selected correction value from the distance.

14. A document size detecting apparatus, comprising:

reading means for reading a document and producing corresponding image data;

first counting means for counting a number of lines that are scanned during a period from a start of reading by the reading means until a time point when an edge of the document is read while the reading means moves from an acceleration state to a constant speed state;

storing means for storing, in advance, a corresponding relationship between a plurality of values and the number of lines;

readout means for reading out, from the storing means, a selected value corresponding to the number of lines counted by the first counting means; and determining means for determining a position of the edge of the document in the auxiliary scanning direction based on the selected value, and thereby detecting a length of the document in the auxiliary scanning direction.

15. A method for detecting a size of a document by using reading means for reading the document and producing corresponding image data, comprising the steps of:

storing, in advance, a corresponding relationship between a plurality of values and a number of lines;

counting the number of lines that are scanned during a period from a start of reading by the reading means until a time point when an edge of the document is read while the reading means moves from an acceleration state to a constant speed state;

reading out, from the storing means, a selected value corresponding to the counted number of lines; and determining a position of the edge of the document in the auxiliary scanning direction based on the selected value, and thereby detecting a length of the document in the auxiliary scanning direction.

* * * * *